United States Patent
Yang et al.

(10) Patent No.: US 9,693,429 B2
(45) Date of Patent: Jun. 27, 2017

(54) SYSTEM AND METHOD FOR CONTROLLING POWER SUPPLY

(71) Applicant: DELTA GREENTECH (CHINA) CO., LTD., Shanghai (CN)

(72) Inventors: Bo Yang, Shanghai (CN); Hu Peng, Shanghai (CN); Xu Wang, Beijing (CN)

(73) Assignee: Delta Greentech (China) Co., Ltd., Shanghai (CN)

( * ) Notice: Subject to any disclaimer, the term of this patent is extended or adjusted under 35 U.S.C. 154(b) by 0 days.

(21) Appl. No.: 15/173,837

(22) Filed: Jun. 6, 2016

(65) Prior Publication Data

US 2016/0360592 A1    Dec. 8, 2016

(30) Foreign Application Priority Data

Jun. 7, 2015  (CN) .......................... 2015 1 0308913

(51) Int. Cl.
  *H05B 37/02*  (2006.01)
(52) U.S. Cl.
  CPC ................................ *H05B 37/0263* (2013.01)
(58) Field of Classification Search
  CPC ............................ H05B 33/0815; H05B 37/02
  USPC ......... 315/160–161, 291, 294–295, 297, 307
  See application file for complete search history.

(56) References Cited

U.S. PATENT DOCUMENTS

2012/0080944 A1* 4/2012 Recker ..................... H02J 9/02
                                                             307/25
2013/0134891 A1* 5/2013 Woytowitz ............. H05B 37/02
                                                             315/201
2014/0265935 A1* 9/2014 Sadwick ............. H05B 33/0815
                                                             315/307

FOREIGN PATENT DOCUMENTS

| CN | 101977478 A | 2/2011 |
|---|---|---|
| CN | 104684205 A | 6/2015 |
| CN | 104955224 A | 9/2015 |
| CN | 105592597 A | 5/2016 |
| JP | 2011-510475 A | 3/2011 |
| WO | 2014/009861 A2 | 1/2014 |

OTHER PUBLICATIONS

ISR issued Jan. 26, 2017 by the WIPO.
1st Office Action issued Mar. 17, 2017 by the JP Office.

* cited by examiner

*Primary Examiner* — Jason M Crawford
(74) *Attorney, Agent, or Firm* — Yunling Ren

(57) ABSTRACT

A system for controlling power supply according to the present disclosure includes a controlled device, a waveform control circuitry and a power detection and control circuitry. A supply voltage is provided to the controlled device for supplying power and, at the same time is applied to the waveform control circuitry for changing its waveform so as to generate a control signal. The control signal is then received and analyzed by the power detection and control circuitry to output a control command, which is used to control the controlled device. Based on the system for controlling power supply, there is also provided a method for controlling power supply, which may be implemented by a smart dimming system to realize remote control of lighting-on, lighting-off, dimming and color temperature regulation.

13 Claims, 7 Drawing Sheets

SYSTEM AND METHOD FOR CONTROLLING POWER SUPPLY

CROSS REFERENCE

This application is based upon and claims priority to Chinese Patent Application No. 201510308913.4, filed on Jun. 7, 2015, the entire contents thereof are incorporated herein by reference.

TECHNICAL FIELD

The disclosure relates to field of power supply, in particularly, to a system and a method for controlling power supply.

BACKGROUND

Conventional dimming modes for AC (Alternating Current) luminaire include SCR (Silicon Controlled Rectifier) dimming, wireless communication dimming and switch dimming. A typical dimming control system is always provided with a dimming controller and a dimming reception module.

In the manner of SCR dimming, an effective output voltage of power grid is adjusted by means of chopping wave so as to implement dimming. In the manner of switch dimming, dimming instructions are issued via switching operations of a typical power switch. In the manner of wireless communication dimming, the function of dimming is implemented by means of conventional wireless communication protocol (e.g. ZigBee, WiFi, Bluetooth and the like) with addition of wireless transmission module in the dimming controller and wireless reception module in the luminaire.

Advantageous effects of the SCR dimming may include: supporting for brightness adjustment, especially stepless brightness adjustment of the luminaire, and low cost in modification of line construction. Defects thereof include poor compatibility of dimming and varying dimming effects among different dimmers. In addition, the dimming process may cause a certain extent of pollution to the power grid.

Advantageous effects of the wireless communication dimming may include capabilities of stepless dimming, networking, and separate control for lamps. Defects thereof lie in complicated control, high cost of implementation, and poor anti-interference performance of control signal.

Advantageous effects of the switch dimming may include simple control and low cost, while defects thereof lie in that lighting-off may occur in the dimming process and it is difficult to realize synchronous dimming of multiple sets of lamp.

To sum up, all of those three conventional manners of dimming have drawbacks of short communication distance, high implementation cost, poor dimming compatibility and so on.

SUMMARY

According to an aspect of the disclosure, there is provided a system for controlling power supply, including:
a controlled device configured to supply power with a supply voltage;
a waveform control circuitry configured to receive the supply voltage and change waveform of the supply voltage to generate a control signal; and
a power detection and control circuitry configured to receive and analyze the control signal to output a control command, and control the controlled device with the control command.

According to another aspect of the disclosure, there is also provide a method for controlling power supply by the disclosure, including:
supplying power to a controlled device with a supply voltage, and receiving the supply voltage and changing a waveform of the supply voltage by a waveform control circuitry to generate a control signal; and
receiving and analyzing the control signal by a power detection and control circuitry to output a control command, and controlling the controlled device with the control command.

The system for controlling power supply according to the present disclosure includes therein a controlled device, a waveform control circuitry and a power detection and control circuitry, wherein a supply voltage is provided to the controlled device for supplying power and, at the same time is applied to the waveform control circuitry for changing its waveform so as to generate a control signal. The control signal is then received and analyzed by the power detection and control circuitry to output a control command, which is used to control the controlled device. Based on the system for controlling power supply, there is also provided the method for controlling power supply, which may be implemented by a smart dimming system to realize remote control of lighting-on, lighting-off, dimming and color temperature regulation. With the technical solution of the disclosure, requirement of remote control can be satisfied for smart luminaire system; reliability can be improved with lowered cost, thus good economic effectiveness is obtained; and materials consumption can be reduced, so value of environmental protection is realized.

DETAILED DESCRIPTION

The disclosure will be described in further details with reference to the drawings and embodiments. Advantages and features of the disclosure will become more apparent from the following description and claims. It should be noted that, the drawings are depicted in a simplified manner with inaccurate scale, and merely for purpose of convenient and clear illustration of the embodiments.

Figure 1:
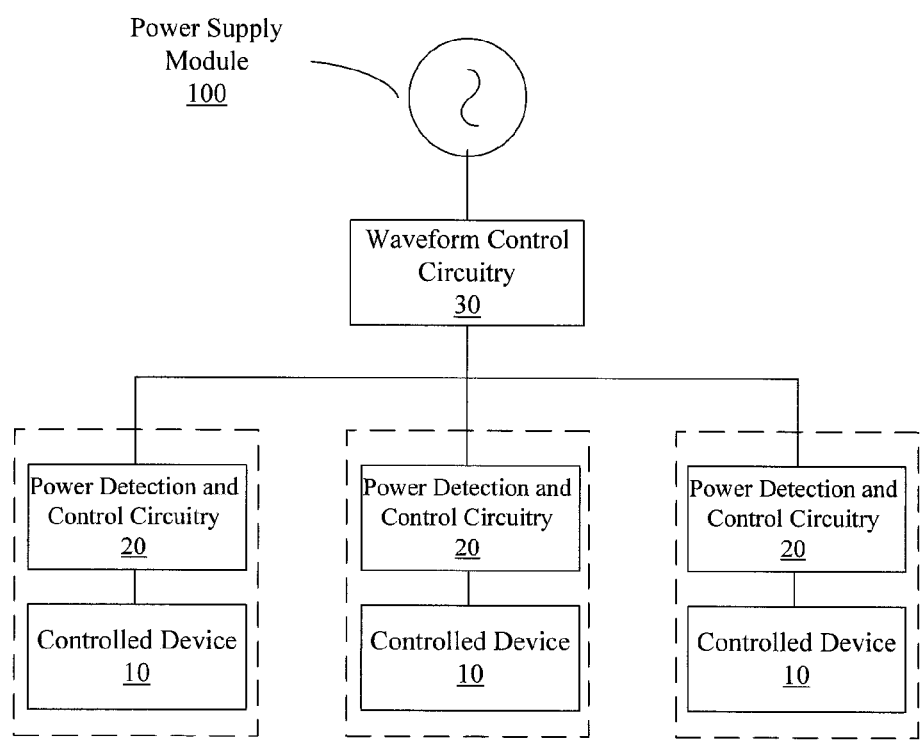
FIG. 1 is a block diagram illustrating the system for controlling power supply according to an embodiment of the disclosure.

As shown in FIG. 1, a system for controlling power supply is provided by the disclosure and includes:

a controlled device 10 configured to supply power with a supply voltage;

a waveform control circuitry 30 configured to receive the supply voltage and change waveform of the supply voltage to generate a control signal; and a power detection and control circuitry 20 configured to receive and analyze the control signal to output a control command, and control the controlled device 10 with the control command.

In an embodiment, a power supply module 100 is connected with the waveform control circuitry 30 and used to provide the supply voltage. The waveform control circuitry 30 is connected with the power detection and control circuitry 20 which in turn is connected with the controlled device 10. Through this structure, the supple voltage is used to supply power to the controlled device after being applied across the waveform control circuitry 30 and the power detection and control circuitry 20. Moreover, the waveform of the supply voltage can be changed by the waveform control circuitry 30 to generate the control signal, which in turn is received and analyzed by the power detection and control circuitry 20 to output the control command. The controlled device 10 may be then controlled with the control command.

In an embodiment, the controlled device 10 is a lamp, and the control command is used to control power on, power off, brightness regulation or color temperature regulation of the lamp. The power detection and control circuitry 20 may be integrated with the controlled device 10 into a single structure such that a controllable lamp component can be created. As shown in FIG. 1, there are a plurality of the controllable lamp components connected with the waveform control circuitry 30 in the embodiment.

For a lamp system supplied with AC power, sine wave having a normal working voltage may be provided by the power supply module 100. The controlled device 10 (lamp) can work well under fluctuation of the supply voltage to a certain degree (e.g. ±20%) as it is typically driven with power by an energy storing device. For example, if the frequency of the power supply is 50 Hz, proper functioning of the controlled device will not be affected even when the power supply is lost within 10 ms.

In an embodiment, the waveform control circuitry 30 includes: a waveform transformation sub-circuitry configured to receive the supply voltage and an instruction signal, and output a transformed waveform of the supply voltage as the control signal; a phase circuit configured to detect the supply voltage to generate a phase signal; and a first control sub-circuitry configured to receive the phase signal and output the instruction signal to the waveform transformation unit.

Figure 2:
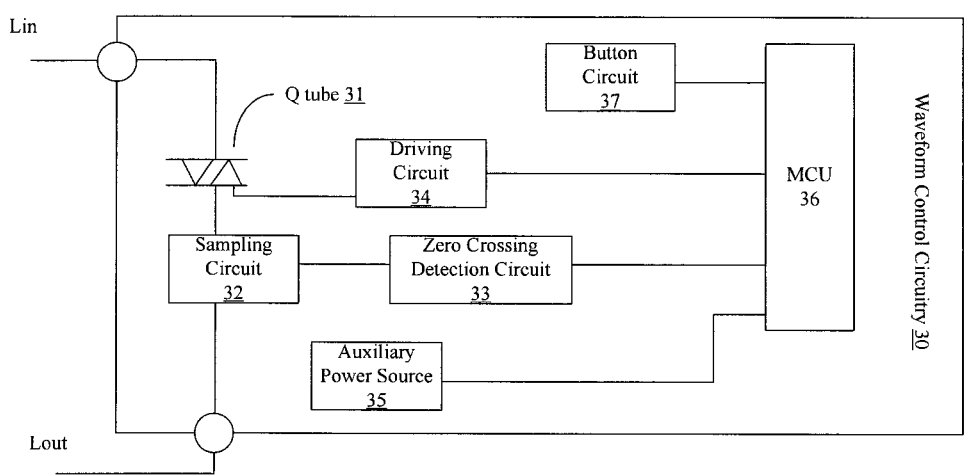
FIG. 2 is a block diagram illustrating a waveform control circuitry in the system for controlling power supply according to an embodiment of the disclosure.

FIG. 2 illustrates an internal structure of the waveform control circuitry 30 according to an embodiment. In the embodiment, MCU 36 serves as the first control sub-circuitry. A semiconductor switch (i.e. Q tube 31) serves as the waveform transformation sub-circuitry of the waveform control circuitry 30 (a switch panel at original position), and the waveform of the supply voltage may be transformed through open and close operations of the Q tube 31 according to the instruction signal. In an embodiment, the Q tube 31 includes a MOS (Metal Oxide Semiconductor) device or an IGBT (Insulated Gate Bipolar Translator) device. The phase circuit includes a sampling circuit 32 configured to sample the waveform of the supply voltage, and a zero crossing detection circuit 33 configured to perform detection of zero crossing on the waveform of the supply voltage, such that a phase signal can be generated. Specifically speaking, the waveform of the supply voltage applied across the waveform control circuitry 30 may be transformed via operations of the Q tube 31; the waveform of the supply voltage may be detected synchronously by the phase circuit inside the waveform control circuitry 30 such that a zero crossing point(s) of the supply voltage can be captured; at the same time, signal of a button circuit 37 may be detected by the MCU 36 such that a processing command of the button circuit 37 can be monitored.

In addition to the Q tube 31, the sampling circuit 32 and the zero crossing detection circuit 33 as described above, the waveform control circuitry 30 may further include a driving circuit 34, which is connected between the Q tube 31 and the MCU 36 and used to drive the Q tube 31; and an auxiliary power source 35 configured to supply power to the MCU 36.

Figure 3:
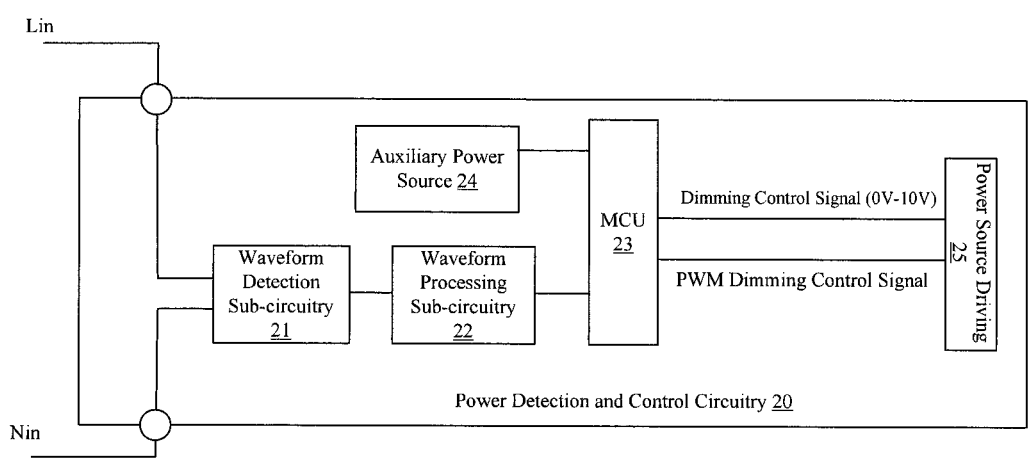
FIG. 3 is a block diagram illustrating a power detection and control circuitry in the system for controlling power supply according to an embodiment of the disclosure.

As shown in FIG. 3, the power detection and control circuitry 20 of the system for controlling power supply includes: a waveform detection sub-circuitry 21 configured to receive the control signal and detect a waveform of the control signal; a waveform processing sub-circuitry 22 configured to compare the detected waveform of the control signal with a predefined protocol; and a second control sub-circuitry configured to generate the control command based on the compared result. In the embodiment, MCU 23 serves as the second control sub-circuitry of the power detection and control circuitry 20. Moreover, the power detection and control circuitry 20 further includes an auxiliary power source 24 for supplying power to the MCU 23. In an embodiment, the control command output by the MCU 23 may include a universal voltage signal or a PWM (Pulse Width Modulation) signal. In the embodiment, a dimming control signal or a PWM dimming control signal at a voltage of 0V-10V is output by the MCU 23. And in some embodiments, the power detection and control circuitry 20 further includes a power source driving circuitry 25, which is a control device providing constant current or constant voltage to the dimming system.

Figure 4:
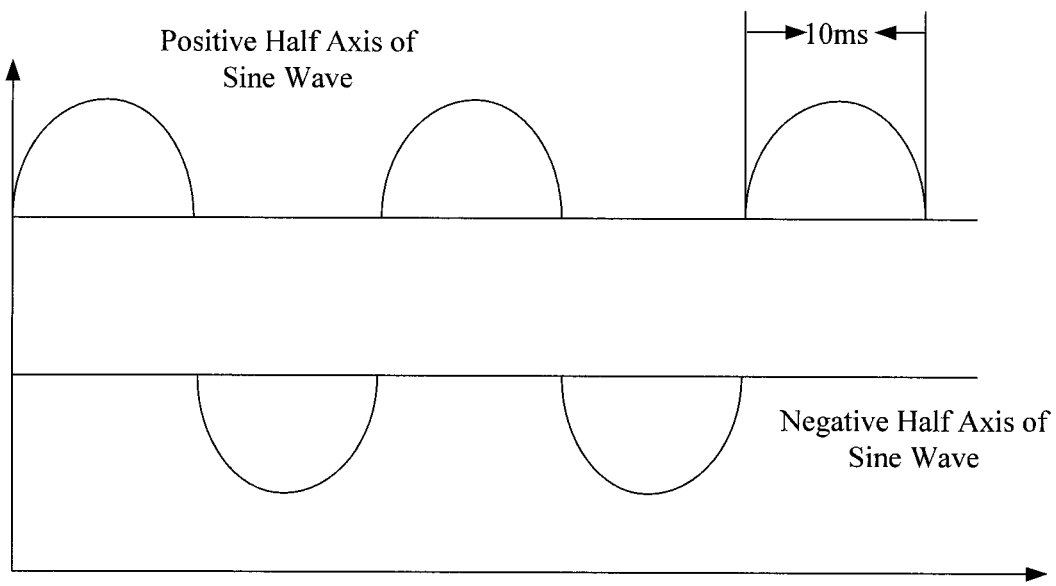
FIG. 4 is a schematic diagram illustrating a waveform obtained by the waveform control circuitry chopping off an upper half axial part or a lower half axial part from sine wave in one cycle according to an embodiment of the disclosure.
Figure 5:
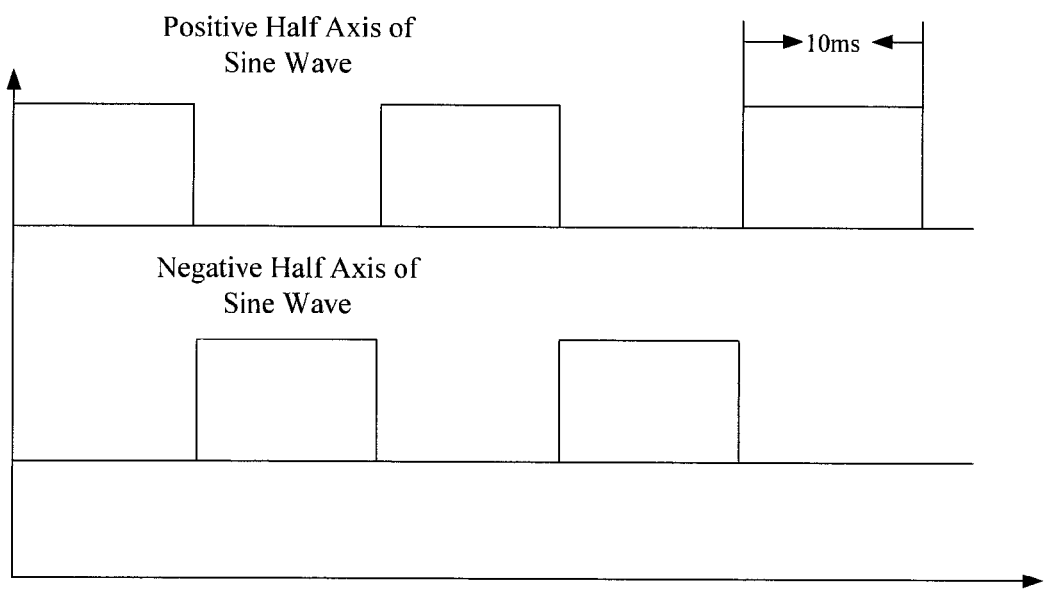
FIG. 5 is a schematic diagram illustrating a waveform obtained by the waveform detection circuitry, transforming the sine wave without half axial part into square wave according to an embodiment of the disclosure.

In an embodiment, the control signal output by the waveform control circuitry 30 which has a waveform of sine wave may be transformed into square wave by the waveform detection sub-circuitry 21 before being transmitted to the waveform processing sub-circuitry 22. Specifically speaking, when the control command is processed at the power detection and control circuitry 20, an upper half axial waveform or a lower half axial waveform (10 ms) in each one cycle (20 ms at a frequency of 50 Hz) of the sine wave may be chopped off from the sine wave of the supply voltage by the MCU 36 based on the signal of the phase circuit. As shown in FIG. 4, the sine wave with half axial waveform being chopped off may be transmitted to the power detection and control circuitry 20 at the lamp side via AC supply lines. Then, the waveform detection sub-circuitry 21 in the power detection and control circuitry 20 can perform detection on the upper or lower half axes of the sine wave. When a complete wave form of the sine wave transmitted through power lines without waveform transformation, a complete square wave will be output by the waveform detection sub-circuitry 21. However, when the sine wave with half axial waveform being chopped off is detected by the waveform detection sub-circuitry 21, the square wave may be obtained by transforming the sine wave with half axial waveform being chopped off at the waveform detection sub-circuitry 21 and in turn be transmitted to the waveform processing sub-circuitry. As shown in FIG. 5, an incomplete waveform of square wave is output. At the same time, the incomplete waveform may be transmitted to the MCU 23 of the power detection and control circuitry 20 for serving as the control command.

In the power detection and control circuitry 20, the supply voltage may be monitored in real time. In an embodiment, variation on the waveform of the supply voltage may be monitored by a half-wave detection circuit of the waveform detection sub-circuitry 21 such that the change of lost square wave can be detected and a waveform of the control signal can be output. The detected waveform of the control signal may be then analyzed according to a predefined protocol by the waveform processing sub-circuitry 22, such that content of the control command transmitted through the supply lines can be parsed out and converted into a universal signal, for example, a universal voltage signal of about 0-10V (e.g., 0V corresponds to a lighting-off command while 10V corresponds to a lighting-on command) or a PWM signal (e.g., a duty ratio of 0 corresponds to a lighting-off command while a duty ratio of 100% corresponds to a lighting-on command), so as to generate the control command. Subsequently, the control commands of lighting-on, lighting-off, dimming or color temperature regulation may be executed, respectively, so as to implement lighting-on, lighting-off, brightness regulation or color temperature regulation of the lamp.

Figure 6:
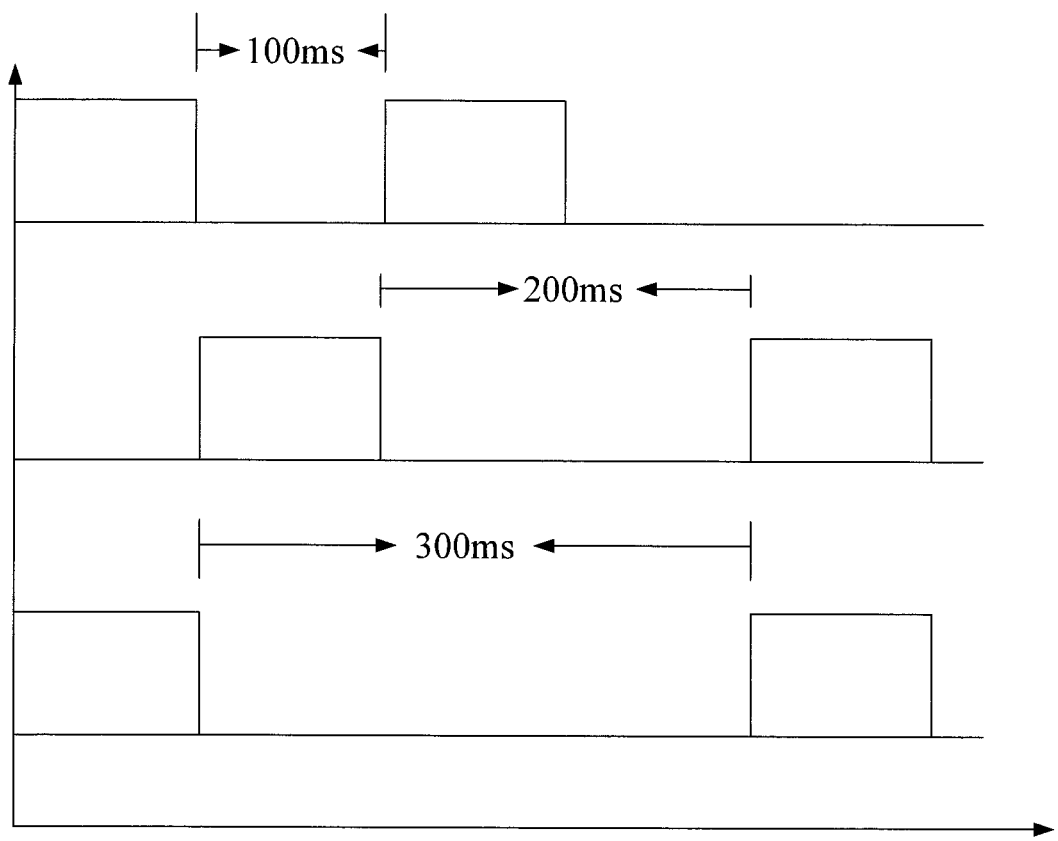
FIG. 6 is a schematic diagram illustrating waveforms corresponding to different control commands in the system for controlling power supply according to an embodiment of the disclosure.

In an embodiment, as shown in FIG. 6, a time interval of 100 ms may correspond to a control command while another timer interval may correspond to another control command. For example, a time interval of 100 ms corresponds to a lighting-on command, a time interval of 200 ms corresponds to a lighting-off command, a time interval of 300 ms corresponds to a dimming command, and a time interval of 400 ms corresponds to a color temperature regulation command. However, only those control commands corresponding to 100 ms-300 ms are illustrated in FIG. 6.

Control signals in the present disclosure may be implemented as any one or combination of analog signals and digital signals. Also, the control signals may be implemented in the form of encoding with any one or combination of time interval, counting, and positive/negative half waves. Moreover, transmission mode of the signals is applicable to various applications of power supply with the power grid, for example, indoor household appliances or outdoor smart devices supplied with AC power, rather than being limited to the application of luminaire.

Furthermore, the content of command transferred by the signals in the disclosure is not limited to application scenarios of lighting-on/off, dimming and color temperature regulation. In other words, the content of command indicated by 0-10V or PWM signal is not limited to 0-10V (0V corresponds to a lighting-off command while 10V corresponds to a lighting-on command) or the PWM signal (a duty ratio of 0 corresponds to a lighting-off command while a duty ratio of 100% corresponds to a lighting-on command) per se, instead, they can be combined in other manners to generate commands of dimming and color temperature regulation.

Figure 7:
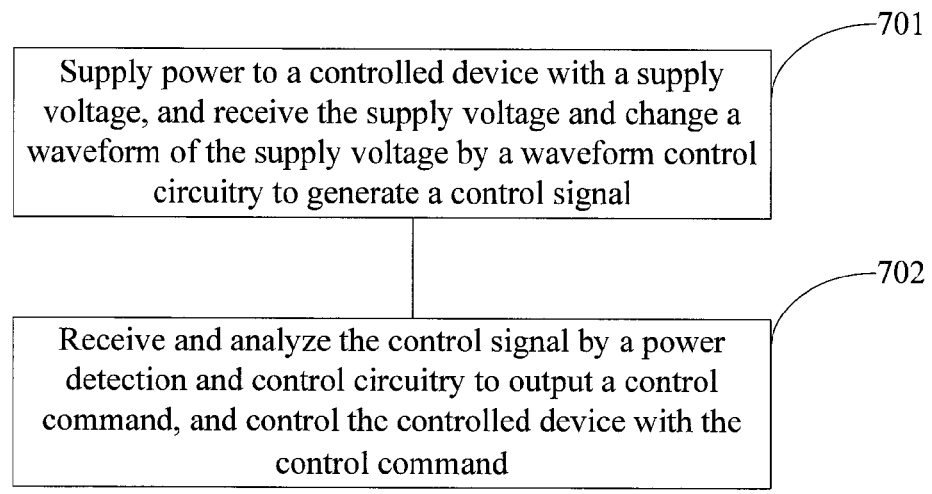
FIG. 7 is a flow chart illustrating a method for controlling power supply according to an embodiment of the disclosure.

As shown in FIG. 7, a method for controlling power supply is also provided by the disclosure and includes following steps.

In step 701, a supply voltage is provided to a controlled device for supplying power, and the supply voltage is received with its waveform being changed by a waveform control circuitry to generate a control signal; and In step 702, the control signal is received and analyzed by a power detection and control circuitry to output a control command, and the controlled device is controlled with the control command.

The method for controlling power supply can be deemed as a working procedure of the system for controlling power supply according to the present disclosure, for which the specific implementation of power supply control has been described in detail in preceding description of the system for controlling power supply, and thus will be not elaborated herein.

The system for controlling power supply provided by the disclosure may serve as a smart dimming system, which includes the waveform control circuitry 30 configured to receive commercial power and change a waveform of the supply voltage, the power detection and control circuitry 20 configured to receive commands from the waveform control circuitry 30 and convert, according to a predefined format of protocol, the commands into analog or digital signals to be output. In this way, the waveform of the supply voltage is changed by the waveform control circuitry 30, and the changed waveform of input voltage is monitored in real time by the power detection and control circuitry 20 such that the content of control command transmitted via the supply lines can be parsed out and then executed, so as to implement remote control of lighting-on, lighting-off, dimming and color temperature regulation.

According to the technical solution described above, commands of lighting-on, lighting-off, dimming and the like can be transferred to every controlled device (lamp) correctly. Moreover, existing switch panels and lamps may be directly replaced without modification of lines, thus reconstruction cost can be decreased substantially. The solution may be compatibly applicable to any new or old type of lamps and any dimmable or undimmable lamps, such that the application range can be extended. With the technical solution provided by the disclosure, requirement of remote control can be satisfied for smart luminaire system; reliability can be improved with lowered cost, thus good economic effectiveness is obtained; and materials consumption can be reduced, so value of environmental protection is realized.

Apparently, various change and modification can be made to the disclosure by those skilled in the art without departing from spirit and scope of the invention. In this way, any change or modification of the disclosure falling within scope defined by the claims and equivalents thereof should be covered by the invention.

What is claimed is:

1. A system for controlling power supply, comprising:
   a controlled device configured to supply power with a supply voltage;
   a waveform control circuitry configured to receive the supply voltage and change waveform of the supply voltage to generate a control signal; and
   a power detection and control circuitry configured to receive and analyze the control signal to output a control command, and control the controlled device with the control command,
   wherein the waveform control circuitry comprises:
   a waveform transformation sub-circuitry configured to receive the supply voltage and an instruction signal, and output the control signal;
   a phase circuit configured to detect the supply voltage to generate a phase signal; and a first control sub-circuitry configured to receive the phase signal and output the instruction signal.

2. The system as claimed in claim 1, wherein the controlled device comprises a lamp and the control command is used to control power on, power off, brightness regulation or color temperature regulation of the lamp.

3. The system as claimed in claim 1, wherein the control signal comprises any one or combination of a digital signal and an analog signal.

4. The system as claimed in claim 1, wherein the phase circuit comprises:
   a sampling circuit configured to sample the supply voltage; and
   a zero crossing detection circuit configured to perform detection of zero crossing on the supply voltage, so as to generate the phase signal.

5. The system as claimed in claim 1, wherein the waveform transformation sub-circuitry comprises a semiconductor switch, and transform waveform of the supply voltage through open and close operations of the semiconductor switch.

6. The system as claimed in claim 5, wherein the semiconductor switch comprises a Metal Oxide Semiconductor MOS device or an Insulated Gate Bipolar Translator IGBT device.

7. The system as claimed in claim 1 wherein the control command comprises a universal voltage signal or a Pulse Width Modulation PWM signal.

8. A system for controlling power supply, comprising:
   a controlled device configured to supply power with a supply voltage;
   a waveform control circuitry configured to receive the supply voltage and change waveform of the supply voltage to generate a control signal; and
   a power detection and control circuitry configured to receive and analyze the control signal to output a control command, and control the controlled device with the control command,
   wherein the power detection and control circuitry comprises:
   a waveform detection sub-circuitry configured to receive the control signal and detect a waveform of the control signal;
   a waveform processing sub-circuitry configured to analyze the detected waveform of the control signal according to a predefined protocol; and
   a second control sub-circuitry configured to generate the control command based on the analysis result.

9. The system as claimed in claim 8, wherein the control signal has a waveform of sine wave, and the waveform detection sub-circuitry is further configured to transform the sine wave into square wave and transmit the square wave to the waveform processing sub-circuitry.

10. The system as claimed in claim 8, wherein the predefined protocol is indicated by a time interval of waveform.

11. The system as claimed in claim 8, wherein the controlled device comprises a lamp and the control command is used to control power on, power off, brightness regulation or color temperature regulation of the lamp.

12. The system as claimed in claim 8, wherein the control signal comprises any one or combination of a digital signal and an analog signal.

13. The system as claimed in claim 8 wherein the control command comprises a universal voltage signal or a Pulse Width Modulation PWM signal.

* * * * *